US012681379B2

(12) United States Patent
Kim et al.

(10) Patent No.: US 12,681,379 B2
(45) Date of Patent: Jul. 14, 2026

(54) CORNER ROUNDING METHOD OF OPC PATTERN BASED ON DEEP LEARNING, AND OPC METHOD AND MASK MANUFACTURING METHOD INCLUDING THE CORNER ROUNDING METHOD

(71) Applicant: Samsung Electronics Co., Ltd., Suwon-si (KR)

(72) Inventors: Kyungsoo Kim, Hwaseong-si (KR); Sooryong Lee, Seoul (KR); Jaewon Yang, Suwon-si (KR); Sangchul Yeo, Osan-si (KR); Hyeok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 899 days.

(21) Appl. No.: 17/972,231

(22) Filed: Oct. 24, 2022

(65) Prior Publication Data

US 2023/0280646 A1 Sep. 7, 2023

(30) Foreign Application Priority Data

Mar. 7, 2022 (KR) ........................ 10-2022-0028962

(51) Int. Cl.
*G03F 1/36* (2012.01)
*G03F 7/00* (2006.01)
(Continued)

(52) U.S. Cl.
CPC ............ *G03F 1/36* (2013.01); *G03F 7/70441* (2013.01); *G03F 7/705* (2013.01);
(Continued)

(58) Field of Classification Search
None
See application file for complete search history.

(56) References Cited

U.S. PATENT DOCUMENTS 8,527,916 B1 9/2013 Chiang et al.
8,612,902 B1 * 12/2013 Agarwal .............. H01L 21/027
716/54
(Continued)

FOREIGN PATENT DOCUMENTS

KR 10-2021-0010897 A 1/2021
KR 10-2021-0035894 A 4/2021
(Continued)

OTHER PUBLICATIONS

M. Guajardo et al., "Fast model-driven target optimization methods using machine learnings," Design-Process-Technology Co-optimization XV, Proc. of SPIE vol. 11614, 2021 SPIE 11 pages. (Year: 2021).*

(Continued)

*Primary Examiner* — Leigh M Garbowski
(74) *Attorney, Agent, or Firm* — Fish & Richardson P.C.

(57) ABSTRACT

The inventive concept provides a corner rounding method of a deep learning-based optical proximity correction (OPC) pattern by which patterning reliability may be ensured, and an OPC method and a mask manufacturing including the corner rounding method. The corner rounding method of a deep learning-based OPC pattern includes: obtaining a contour of a photoresist (PR) pattern or an etching pattern on a wafer; obtaining a square layout of the PR pattern or the etching pattern corresponding to the contour; generating a transform model through deep learning with the square layout and the contour; and obtaining a rounded layout target with respect to a square layout target by using the transform model.

20 Claims, 11 Drawing Sheets

(51) Int. Cl.
  *G06F 30/27*        (2020.01)
  *G06F 30/30*        (2020.01)
  *G06F 119/18*       (2020.01)

(52) U.S. Cl.
  CPC ........ *G03F 7/706841* (2023.05); *G06F 30/27* (2020.01); *G06F 2119/18* (2020.01)

(56)            References Cited

U.S. PATENT DOCUMENTS

| | | | |
|---|---|---|---|
| 8,735,297 B2 | 5/2014 | Kurjanowicz | |
| 8,997,027 B2* | 3/2015 | Hamouda | G06F 30/398 716/54 |
| 9,355,209 B2 | 5/2016 | Chuang et al. | |
| 10,691,864 B2 | 6/2020 | Wang et al. | |
| 10,831,977 B1 | 11/2020 | Gheith et al. | |
| 11,048,161 B2 | 6/2021 | Wang et al. | |
| 2020/0174380 A1* | 6/2020 | Huang | G06N 3/09 |
| 2021/0072635 A1 | 3/2021 | Ma et al. | |

| | | | |
|---|---|---|---|
| 2023/0132893 A1* | 5/2023 | Kwon | G03F 1/70 430/5 |
| 2024/0272543 A1* | 8/2024 | Lyu | G03F 7/70441 |
| 2024/0385530 A1* | 11/2024 | Huang | G03F 7/705 |

FOREIGN PATENT DOCUMENTS

| | | |
|---|---|---|
| WO | WO 2017171890 A1 | 10/2017 |
| WO | WO-2020-135988 A1 | 7/2020 |
| WO | WO-2020-169303 A1 | 8/2020 |
| WO | WO 2021160522 A1 | 8/2021 |

OTHER PUBLICATIONS

P. Evanschitzky et al., "Mask defect detection with hybrid deep learning network" J. Micro/Nanopattern. Mater. Metrol., vol. 20(4), Oct.-Dec. 2021, 18 pages. (Year: 2021).*

Office Action in Korean Appln. No. 10-2022-0028962, mailed on Nov. 13, 2025, 10 pages (with English translation).

Notice of Allowance in Korean Appln. No. 10-2022-0028962, mailed on Apr. 15, 2026, 4 pages (with English translation).

* cited by examiner

FIG. 2

R-ACl1
ACl1

CORNER ROUNDING METHOD OF OPC PATTERN BASED ON DEEP LEARNING, AND OPC METHOD AND MASK MANUFACTURING METHOD INCLUDING THE CORNER ROUNDING METHOD

CROSS-REFERENCE TO RELATED APPLICATION

This application is based on and claims priority under 35 U.S.C. § 119 to Korean Patent Application No. 10-2022-0028962, filed on Mar. 7, 2022, in the Korean Intellectual Property Office, the disclosure of which is incorporated by reference herein in its entirety.

BACKGROUND

The inventive concepts relate to a mask manufacturing method, and more particularly, to an optical proximity correction (OPC) method and a mask manufacturing method.

In a semiconductor process, a photolithography process using a mask may be performed to form a pattern on a semiconductor substrate, such as a wafer. The mask may be called a pattern-transferred body having a pattern shape of an opaque material, which is formed on a base layer material. To manufacture this mask, a layout of a required or target pattern is first designed, and then OPCed layout data obtained through OPC is transmitted as mask tape-out (MTO) design data. Thereafter, based on the MTO design data, mask data preparation (MDP) may be performed, and an exposure process (and the like) may be performed on a substrate for the mask.

SUMMARY

The inventive concepts provide a corner rounding method of a deep learning-based optical proximity correction (OPC) pattern by which patterning reliability may be ensured, and an OPC method and a mask manufacturing method including the corner rounding method.

In addition, problems to be solved by the technical idea of the inventive concepts are not limited to the problems described above, and the other problems could be clearly understood to those of ordinary skill in the art from the description below.

According to an aspect of the inventive concepts, there is provided a method of training a transform model to perform a corner rounding method of a deep learning-based optical proximity correction (OPC) pattern, the corner rounding method including: obtaining a contour of at least one of a photoresist (PR) pattern or an etching pattern on a wafer; obtaining a square layout of the at least one PR pattern or etching pattern corresponding to the contour; and generating a transform model through deep learning with the square layout and the contour such that the transform model is configured to output a rounded layout target with respect to a square layout target.

According to another aspect of the inventive concepts, there is provided an OPC method including: generating a retarget layout including straight edges; performing OPC on the retarget layout such that an OPCed layout is generated; performing an optical rule check (ORC) on the OPCed layout; determining whether there is a defect in the OPCed layout based on a result of the ORC; determining the OPCed layout to be a final OPCed layout based on the determination that there is no defect; and etching a semiconductor element based on the final OPCed layout, wherein at least one of the retarget layout or the OPCed layout is generated based on a corner rounding of a deep learning-based OPC pattern.

According to another aspect of the inventive concepts, there is provided a mask manufacturing method including: performing an optical proximity correction (OPC) on the retarget layout such that an OPCed layout is generated; performing an optical rule check (ORC) on the OPCed layout; determining whether there is a defect in the OPCed layout based on a result of the ORC; and determining the OPCed layout to be a final OPCed layout based on the determination that there is no defect; transmitting an image of the final OPCed layout as mask tape-out (MTO) design data; preparing mask data based on the MTO design data; and exposing a substrate to light, based on the mask data, wherein at least one of the retarget layout or the OPCed layout is generated based on a corner rounding of a deep learning-based OPC pattern.

BRIEF DESCRIPTION OF THE DRAWINGS

Example embodiments of the inventive concepts will be more clearly understood from the following detailed description taken in conjunction with the accompanying drawings in which:

FIG. 2 is a conceptual diagram of describing a part to which the corner rounding method is applied in the OPC method of FIG. 1, among eight major steps to semiconductor fabrication;

DETAILED DESCRIPTION OF THE EMBODIMENTS

Figure 1:
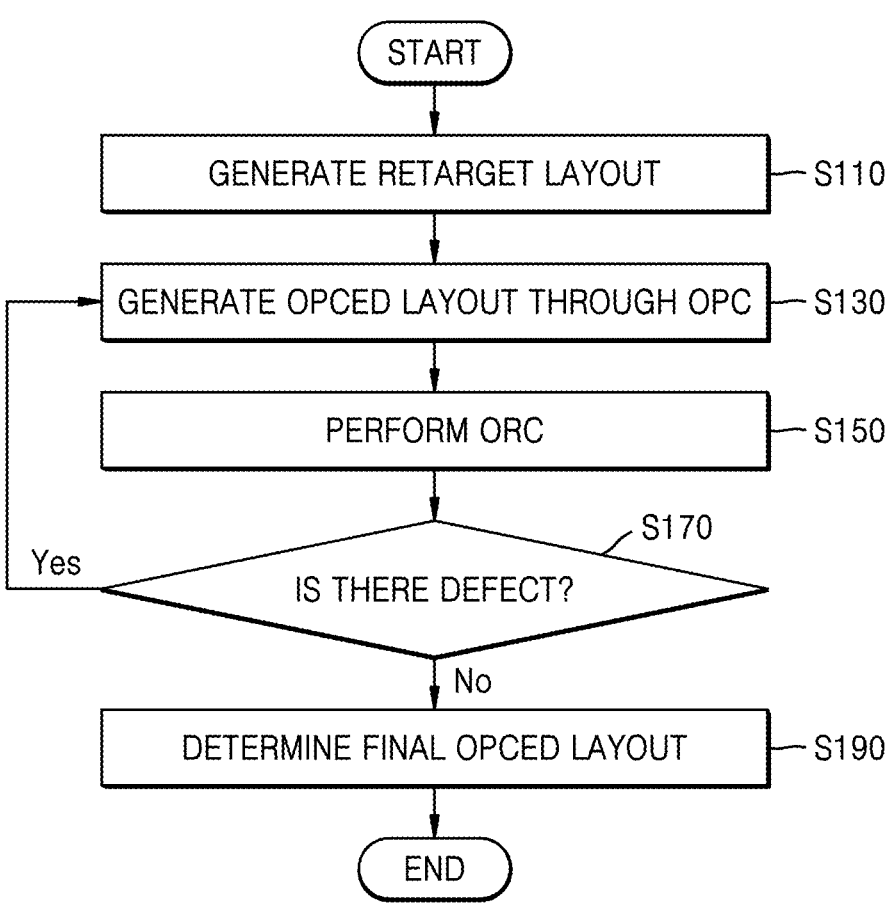
FIG. 1 is a flowchart schematically illustrating an optical proximity correction (OPC) method including a corner rounding method of a deep learning-based OPC pattern, according to at least one embodiment of the inventive concepts.

Hereinafter, some example embodiments of the inventive concepts are described in detail with reference to the accompanying drawings. Like reference numerals in the drawings denote like elements, and their repetitive descriptions are omitted.

FIG. 1 is a flowchart schematically illustrating an optical proximity correction (OPC) method including a corner rounding method of a deep learning-based OPC pattern, according to at least one embodiment of the inventive concepts.

Referring to FIG. 1, in the OPC method including the corner rounding method of a deep learning-based OPC pattern (hereinafter, simply "OPC method") according to the present example, first, a retarget layout is generated in operation S110. The retarget layout may be generated by the corner rounding method of the deep learning-based OPC pattern (hereinafter, simply "corner rounding method"). The corner rounding method is described in more detail with reference to FIGS. 5A and 5B. In addition, the generating the retarget layout by the corner rounding method is described in more detail with reference to FIG. 7A.

As a reference, to generally form a target pattern on a wafer substrate, a target layout of a pattern on a mask is first generated. Herein, the target pattern indicates a pattern formed by transferring the pattern on the mask onto the wafer substrate through an exposure process, and the shape of the target pattern may be different from the shape of the pattern on the mask according to the characteristics of the exposure process. In addition, because the pattern on the mask may be reduction-projected and transferred onto the wafer substrate, the pattern on the mask may have a greater size than the target pattern on the wafer substrate.

Along with pattern micro-fabrication, an optical proximity effect (OPE) (e.g., due to an influence between neighboring patterns) may occur during the exposure process. To overcome the OPE, OPC for suppressing the OPE from occurring (e.g., by correcting a target layout of a pattern on a mask) may be performed. In addition, to ensure the reliability of patterning according to a corner rounding change in an exposure process and/or an etching process (e.g., before performing general OPC) generating a retarget layout (e.g., by correcting a target layout of a pattern on a mask) may be performed in advance. The general OPC is described in more detail in the description of operation S130 of generating an OPCed layout through OPC.

With respect to the corner rounding change, an existing scheme of analyzing corner rounding of sampled patterns on a wafer substrate to correct a target layout based on a corner rounding difference may be employed, but the reliability of such a scheme decreases because correction values of sampled patterns are applied as approximate values to target layouts of various patterns. However, the OPC method according to the present example may generate a retarget layout by using the corner rounding method, thereby improving the accuracy and reliability of patterning.

After generating the retarget layout, an OPCed layout is generated through OPC in operation S130. Herein, the OPC may indicate the general OPC. The OPC method may further include additional operations, such as performing an optical rule check (ORC) in operation S150 and/or the like.

The general OPC may be classified as at least one of a rule-based OPC and/or a simulation-based (or model-based) OPC. In some examples, the model-based OPC may be faster and/or cheaper compared to the rule-based OPC as only a measurement result of representative patterns is used in the model-based OPC (e.g., without measuring all of bulk test patterns).

The general OPC may include a method of adding sub-lithographic features (or serifs) and/or sub-resolution assist features (SRAFs) (such as scattering bars) onto a corner of a pattern in addition to a shape change in a layout of the pattern.

The performing the OPC may first include preparing basic data for the OPC. Herein, the basic data may include data of at least one of shapes of patterns of samples, positions of the patterns, types of measurements (e.g., on spaces, lines, and/or the like of the patterns), basic measurement values, and/or the like. In addition, the basic data may include information about at least one of the thickness, the refractive index, the dielectric constant, and/or the like of a photoresist (PR) and/or may include a source map of an illumination system form. Of course, the basic data is not limited to the data described above.

After preparing the basic data, an optical OPC model is generated. The generating the optical OPC model may include improving (or optimizing) a defocus stand (DS) position, a best focus (BF) position, and/or the like in an exposure process. In addition, the generating the optical OPC model may include generating an optical image and/or the like, considering a diffraction phenomenon of light and/or a self-optical state of exposure equipment. Of course, the generating the optical OPC model is not limited to the description made above. For example, the generating the optical OPC model may include various information associated with optical phenomena in an exposure process.

After generating the optical OPC model, an OPC model for a PR is generated. The generating the OPC model for the PR may include generating (or optimizing) a threshold for the PR. Herein, the threshold for the PR indicates a threshold at which a chemical change occurs in an exposure process, and for example, the threshold may be given as the intensity of exposure light. The generating the OPC model for the PR may further include selecting an appropriate model form from among a plurality of PR model forms.

The combination of the optical OPC model and the OPC model for the PR may be generally referred to as the OPC model. The generating the OPC model may also be referred as training or learning the OPC model. After generating the OPC model, a simulation using the OPC model is performed to generate an OPCed layout. The OPC method according to the present embodiment may further include, in addition to the general OPC, generating an OPCed layout based on the corner rounding method. The generating the OPCed layout is described in more detail with reference to FIG. 7B.

After generating the OPCed layout, an ORC is performed on the OPCed layout in operation S150. The ORC may include, for example, a root mean square (RMS) calculation on a critical dimension (CD) error, an edge placement error (EPE) calculation, a pinch error check, a bridge error check, and/or the like. Of course, items inspected in the ORC are not limited to the items described above.

After performing the ORC, it is determined, in operation S170, whether there is a defect. Herein, the defect may correspond to when an RMS of a CD error is greater than a set reference value, when an EPE is greater than a set reference value, when there is a pinch error, when there is a bridge error, and/or the like. In addition, when there are other items in the ORC, corresponding items that deviate from reference values may also correspond to defects. According to at least one embodiment, operation S170 of determining whether there is a defect may be included in operation S150 of performing the ORC.

If there is a defect (Yes), the OPC method proceeds back to operation S130 of generating an OPCed layout through OPC. Before reiterating operation S130 of generating an OPCed layout through OPC, a cause of the defect may be analyzed, and the cause may be reflected in the OPC model.

If there is no defect (No), an OPCed layout, in which there is no defect, is determined to be a final OPCed layout in operation S190. The final OPCed layout may correspond to design data of a mask. Thereafter, the final OPCed layout may be transmitted to a mask manufacturing team as mask tape-out (MTO) design data for manufacturing a mask. For example, in at least one embodiment, the final OPCed layout may be transmitted as instructions to semiconductor fabrication equipment and a semiconductor device may be manufactured based on the final OPCed layout.

The OPC method according to the present embodiment may accurately generate a retarget layout and/or an OPCed layout based on the corner rounding method of a deep learning-based OPC pattern. Accordingly, the OPC method according to the present example may contribute to manufacturing of a reliable mask and improvement of the accuracy and reliability of patterning by the mask.

Figure 2:
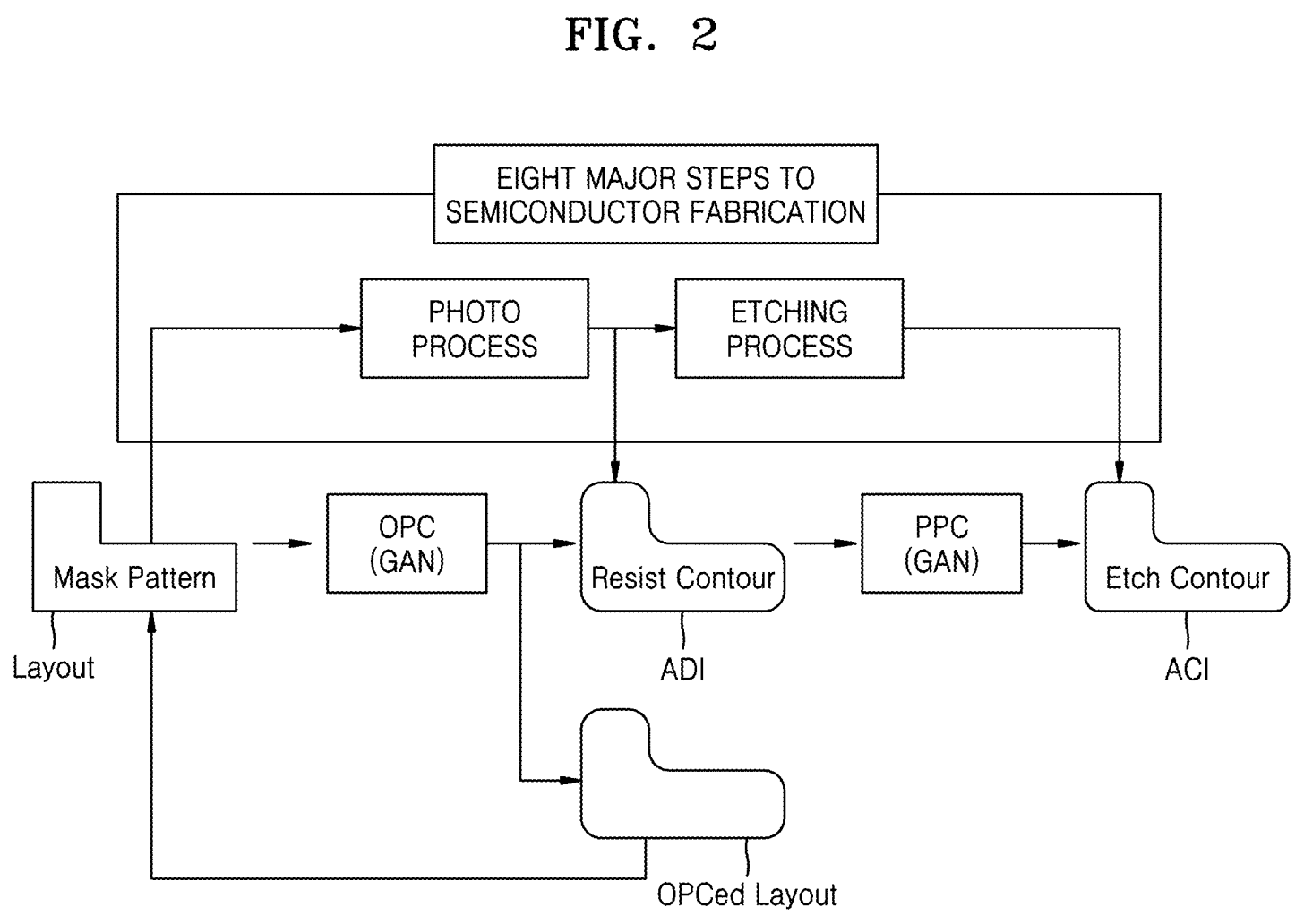

FIG. 2 is a conceptual diagram of describing a part to which the corner rounding method is applied in the OPC method of FIG. 1, among eight major steps to semiconductor fabrication.

Referring to FIG. 2, in general, a photo process may indicate a process of forming a PR pattern on a wafer substrate (e.g., through an exposure process using a mask), and a development process. In addition, an etching process may indicate a process of forming a pattern on the wafer substrate (and/or on a material layer on the wafer substrate) using the PR pattern. In the etching process, process proximity correction (PPC) may be performed to compensate for an etch bias.

OPC may be performed in the photo process, and an image (and/or data) of an OPCed layout may be obtained through the OPC. Accordingly, the photo process may include generating an OPCed layout through OPC, manufacturing a mask based on the OPCed layout, forming a PR pattern on a wafer substrate through an exposure process using the mask, and/or the like.

The OPC method according to the present example may include the corner rounding method of a deep learning-based OPC pattern. Deep learning may be performed using, for example, a generative adversarial network (GAN), CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network and BNN (Bayesian Neural Network). Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests. In at least one embodiment, in the corner rounding method of the OPC method according to the present example, an input image provided to a transform model may be an after develop inspection (ADI) target image, and an output image from the transform model may be a contour image of a PR pattern on a wafer substrate. Herein, the contour image of the PR pattern may correspond to a rounded ADI target image. In the corner rounding method of the PPC, an input image provided to the transform model may be an after cleaning inspection (ACI) target image, and an output image from the transform model may be a contour image of an etching pattern on a wafer substrate. Herein, the contour image of the etching pattern may correspond to a rounded ACI target image. Generating a transform model through deep learning using a GAN, and a structure of the GAN are described in more detail with respect to FIGS. 3 and 4.

Figure 3:
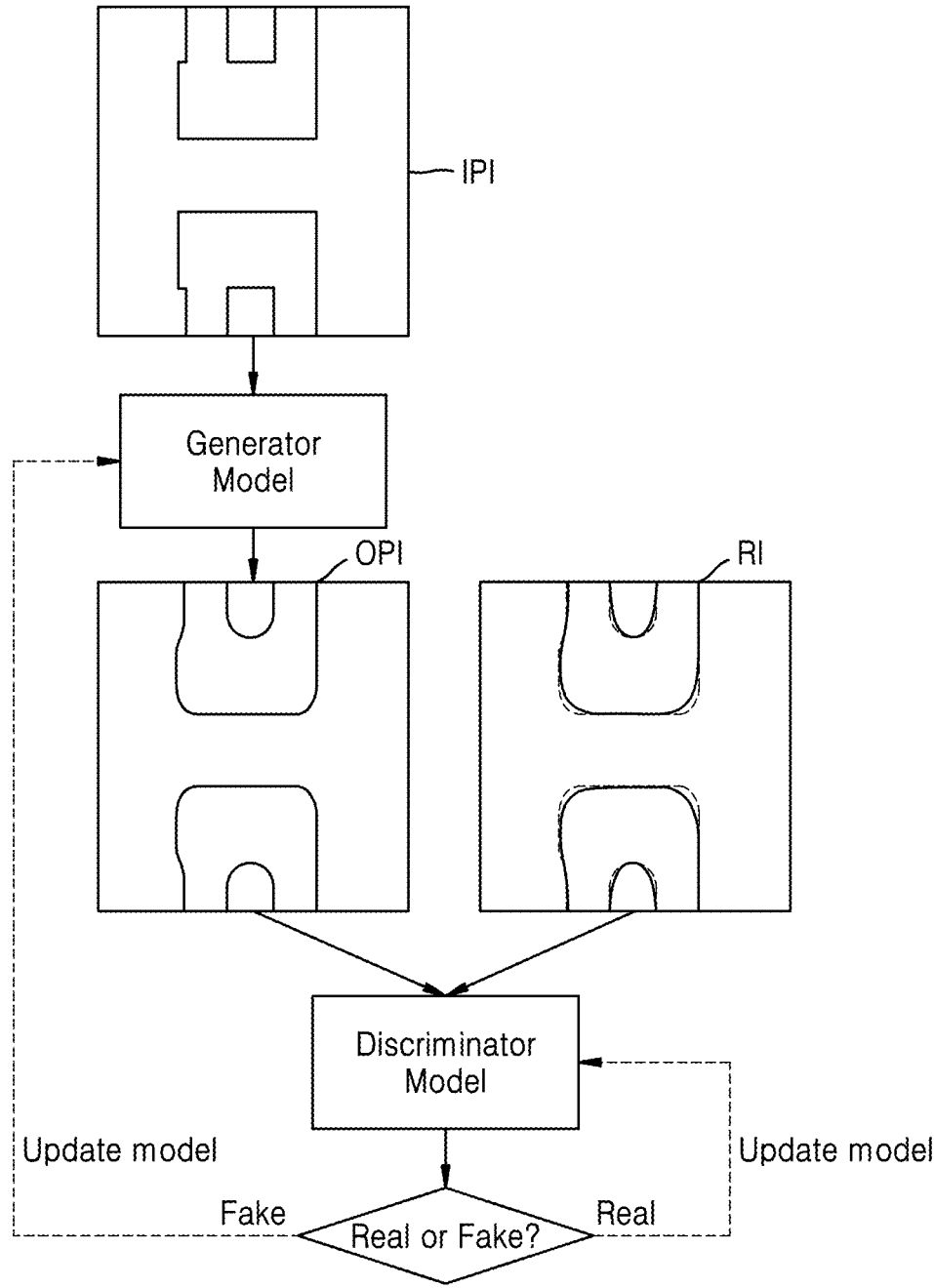
FIG. 3 is a conceptual diagram of describing generating a transform model through deep learning using a generative adversarial network (GAN), which is used in the corner rounding method in the OPC method of FIG. 1.

FIG. 3 is a conceptual diagram of describing generating a transform model through deep learning using a GAN, which is used in the corner rounding method in the OPC method of FIG. 1.

Referring to FIG. 3, in the corner rounding method in the OPC method according to the present example, an input image and an output image may be used as images for deep learning using the GAN. When simply describing the GAN, the GAN may include two sub-models as deep learning-based generative algorithms That is, the GAN may include a generator model and a discriminator model. The generator model may correspond to the transform model in the OPC method. The generator model generates new examples, and the discriminator model determines whether a generated example is real data or fake data generated by the generator model.

For example, the generator model may transform an input image to generate an output image OPI corresponding to an image after OPC and/or PPC. For example, in the OPC, an input image IPI provided to the generator model may be an ADI image, and an output image OPI from the generator model may be a contour image of a PR pattern on a wafer substrate. In addition, in the PPC, an input image IPI provided to the generator model may be an ACI image, and an output image OPI from the generator model may be a contour image of an etching pattern on a wafer substrate.

An output image OPI generated by the generator model and a reference image RI may be input to the discriminator model. Herein, the reference image RI may correspond to a final image (e.g., which an output image OPI is supposed to reach). For example, when an output image OPI may be a contour image of a PR pattern, the reference image RI may be a rounded ADI target image corresponding to a PR pattern on a real wafer substrate. In addition, when the output image OPI is a contour image of an etching pattern, the reference image RI may be a rounded ACI target image corresponding to an etching pattern on a real wafer substrate. The discriminator model compares an output image OPI with the reference image RI and determines whether the output image OPI is a real image or a fake image generated by the generator model. In other words, the discriminator model may determine that an output image OPI is a "real" image if the output image OPI is the same (e.g., within a preset (or otherwise determined) tolerance threshold) as the reference image RI, and determine that the output image OPI is a fake image if the output image OPI differs from the reference image RI beyond the preset (or otherwise determined) tolerance threshold.

Particularly, in FIG. 3, when an ADI image as an input image IPI is input to the generator model, the generator model generates an output image OPI, which is a contour image of a PR pattern. Thereafter, the output image OPI and a reference image RI are input to the discriminator model. Herein, the reference image RI may be a rounded ADI target image corresponding to a PR pattern on a real wafer substrate. In the reference image RI of FIG. 3, the solid line indicates the rounded ADI target image, and the dashed line indicates the contour image of the PR pattern of the output image OPI.

Thereafter, the discriminator model determines whether the output image OPI is the same as the reference image RI. For example, the discriminator model determines whether a contour image of a PR pattern generated by the generator model is substantially the same as a rounded ADI target image corresponding to a PR pattern on a real wafer substrate. Thereafter, according to a result of the determination, the generator model and the discriminator model are continuously updated. When the discriminator model cannot discriminate the output image OPI from the reference image RI any more according to repeating this procedure described above, deep learning ends, and the generator model at this time point may be adopted as a final transform model. When deep learning ends, the discriminator model may be discarded.

Figure 4:
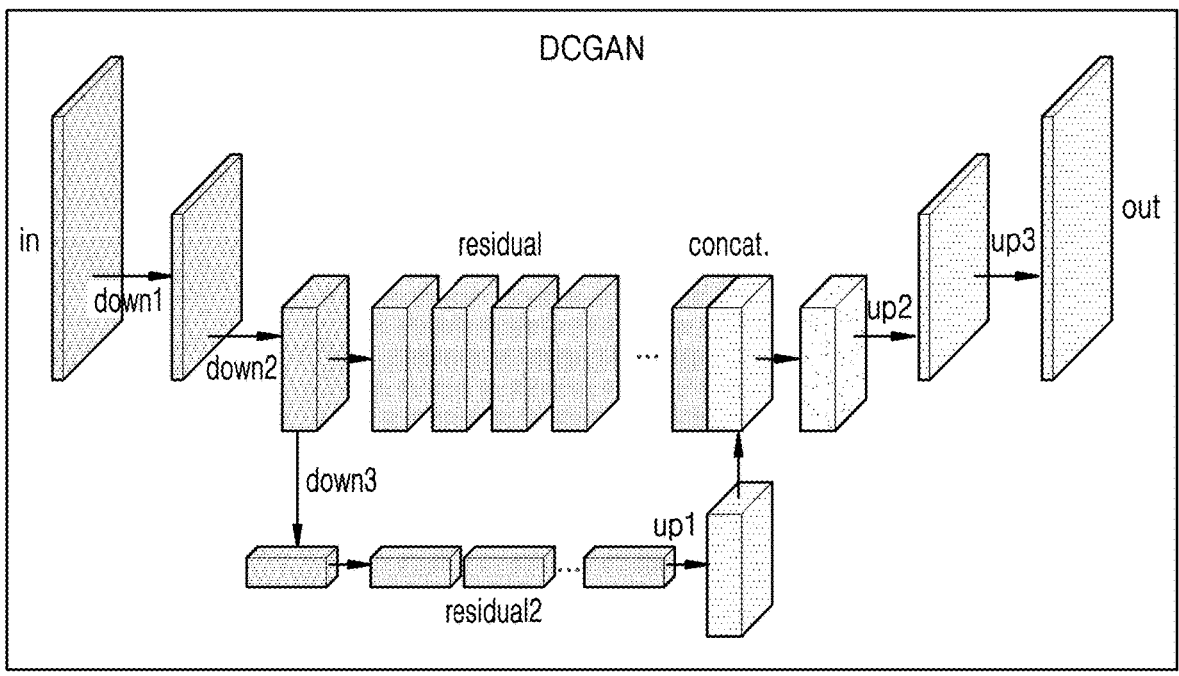
FIG. 4 is a block structural diagram particularly illustrating a structure of the GAN used in the corner rounding method in the OPC method of FIG. 1.

FIG. 4 is a block structural diagram particularly illustrating a structure of the GAN used in the corner rounding method in the OPC method of FIG. 1.

Referring to FIG. 4, in the corner rounding method in the OPC method according to the present embodiment, in order for the generator model of the GAN (e.g., a transform model) to generate a relatively accurate image, features may be accurately extracted from input images. In some example embodiments, convolution, as shown in FIG. 4, may be performed to extract the features. Accordingly, in the corner rounding method in the OPC method, the GAN may be a deep convolution GAN (DCGAN). The convolution is performed using a convolution filter and may include down-sampling and up-sampling. In addition, for relatively accurate learning, residual learning may be included between the down-sampling and the up-sampling. Through the residual learning, an optical effect of a peripheral region may be reflected.

In the corner rounding method in the OPC method, a once more down-sampled image down3 may be used for residual learning, then up-sampled up1, concatenated with a previous image having undergone the residual learning, and up-sampled (e.g., up2). In addition, in the corner rounding method in the OPC method according to the present embodiment, down-sampling may be performed twice (or more), and residual learning may be performed with each image having undergone down-sampling twice (or more).

In the OPC method, the GAN may include a plurality of down-sample layers (e.g., to have a structure of enabling a pixel correlation up to a far distance). In some example embodiments, when an input image passes through a down-sample layer, the input image may be reduced (e.g., to a half size) at an output layer. However, because a reduced image still implies pattern information corresponding to the same width as the width of the input image, information represented by one pixel may correspond to two times (or four times in an area concept) of that of the input image. As a result, even though kernels of the same size are used, a kernel applied to an image having passed through a greater number of down-sample layers may represent a pixel correlation of a wider region.

In addition, with respect to residual learning, although a residual block first structure is illustrated in FIG. 4, a residual block last structure may be used instead. For example, residual learning may be performed after down-sampling in the residual block first structure, whereas down-sampling may be performed after residual learning in the residual block last structure. Although image synthesis may be performed using a concatenation layer structure, the image synthesis may be performed using a sum-fusion layer structure. The concatenation layer structure may have a twice larger structure in a channel direction, and thus, a kernel may also be larger, and a greater number of parameters are included. In addition, the sum-fusion layer structure may be generated through an elementwise sum, and thus, an output result of a similar performance may be obtained while maintaining a small-sized kernel.

Figure 5A:
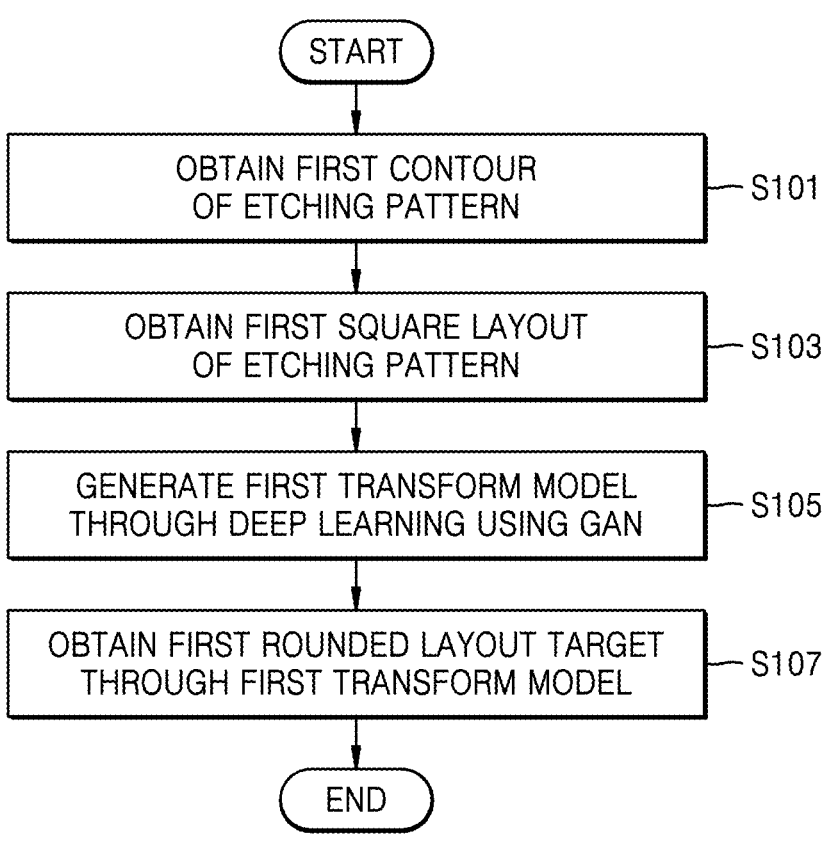
FIGS. 5A and 5B are flowcharts more particularly illustrating the corner rounding method in an operation of generating a retarget layout and an operation of generating an OPCed layout, respectively, in the OPC method of FIG. 1.
Figure 5B:
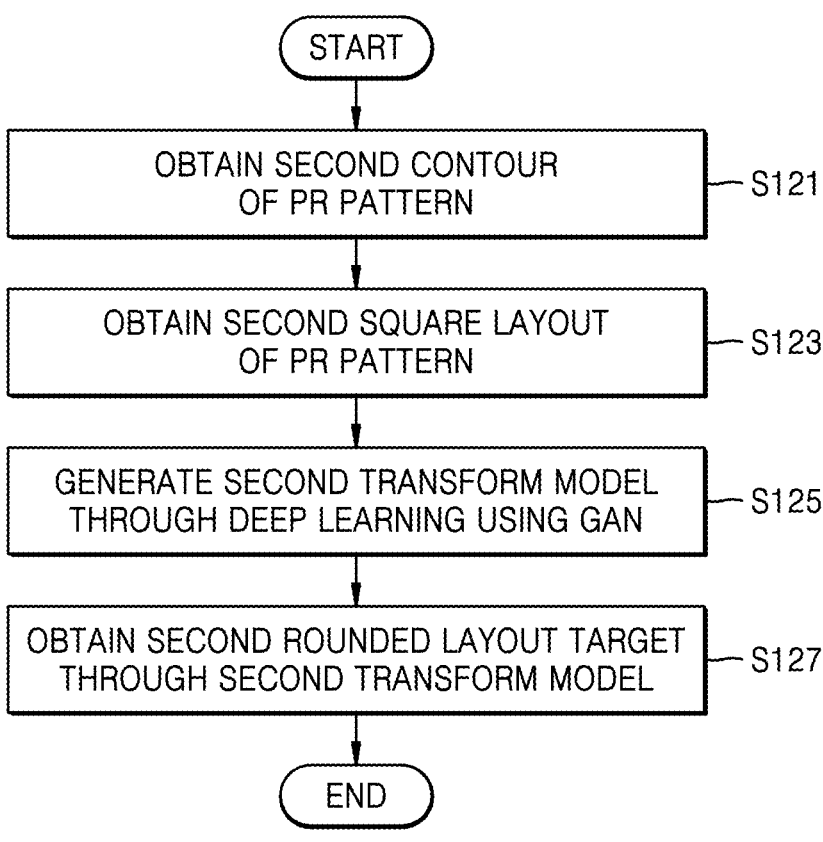

FIGS. 5A and 5B are flowcharts more particularly illustrating the corner rounding method in operation S110 of generating a retarget layout and operation S130 of generating an OPCed layout, respectively, in the OPC method of FIG. 1.

Referring to FIG. 5A, in an OPC method, operation S110 of generating a retarget layout may include the corner rounding method. For example, in operation S110 of generating a retarget layout, the corner rounding method may include the following operations. First, a first contour of an etching pattern is obtained in operation S101. The etching pattern may indicate a pattern formed through an etching process using a PR pattern on a wafer substrate. The etching pattern may have corners rounded by a corner rounding effect in the etching process. The first contour may be generated using, e.g., a mean value from a plurality of scanning electron microscope (SEM) images of the etching pattern.

Next, a first square layout of the etching pattern is obtained in operation S103. Herein, a square layout may indicate a layout including only square edges. Accordingly, the first square layout may include only square edges. The first square layout may be obtained by performing Manhattanization on the first contour. As a reference, several first contours may correspond to one first square layout. For example, in correspondence to ACI of one square layout, various forms of contours of the etching pattern on the wafer substrate may be obtained. Manhattanization is described in more detail with reference to FIGS. 8A and 8B.

Thereafter, a first transform model is generated through deep learning using, e.g., a GAN in operation S105. In the deep learning, the first transform model may correspond to a generator model, a first square layout may correspond to an input image, and a first contour may correspond to an output image. Deep learning may be performed using a plurality of first square layouts and first contours corresponding to the plurality of first square layouts, and a final generator model may be generated as the first transform model. Herein, the first square layout may correspond to ACI, and the first contour may correspond to rounded ACI.

After generating the first transform model, a first rounded layout target is obtained through the first transform model in operation S107. For example, when a first square layout target corresponding to a target is input to the first transform model, the first transform model may output a first contour (e.g., a first rounded layout target) corresponding to the first square layout target. Herein, the first square layout target may indicate an ACI target of a square layout form, and the first rounded layout target may correspond to a rounded ACI target in which corner rounding in an etching process is reflected.

The OPC method according to the present example may accurately obtain a rounded ACI target in which corner rounding is reflected, by using the corner rounding method of a deep learning-based OPC pattern, in operation S110 of generating a retarget layout.

Referring to FIG. 5B, in the OPC method operation S130 of generating an OPCed layout may include the corner rounding method. Particularly, in operation S130 of generating an OPCed layout, the corner rounding method may include the following operations. First, a second contour of a PR pattern is obtained in operation S121. The PR pattern may indicate a PR pattern formed through an exposure process on a PR layer on a wafer substrate. The exposure process may include a development process. The PR pattern may have corners rounded by a corner rounding effect in the exposure process. The second contour may be generated using a mean value from a plurality of SEM images of the PR pattern.

Next, a second square layout of the PR pattern is obtained in operation S123. The second square layout may also include only square edges. The second square layout may be obtained by performing Manhattanization on the second contour. As a reference, several second contours may correspond to one second square layout. In other words, in correspondence to ADI of one square layout, various forms of contours of the PR pattern on the wafer substrate may be obtained.

Thereafter, a second transform model is generated through deep learning using, e.g., a GAN, in operation S125. In the deep learning, the second transform model may correspond to a generator model, the second square layout may correspond to an input image, and the second contour may correspond to an output image. Deep learning may be performed using a plurality of second square layouts and second contours corresponding to the plurality of second square layouts, and a final generator model may be generated as the second transform model. Herein, the second square layout may correspond to ADI, and the second contour may correspond to rounded ADI.

After generating the second transform model, a second rounded layout target is obtained through the second transform model in operation S127. For example, when a second square layout target corresponding to a target is input to the second transform model, the second transform model may output a second contour (e.g., a second rounded layout target) corresponding to the second square layout target. Herein, the second square layout target may indicate an ADI target of a square layout form, and the second rounded layout target may correspond to a rounded ADI target in which corner rounding in an exposure process is reflected.

The OPC method according to the present embodiment may accurately obtain a rounded ADI target in which corner rounding is reflected, by using the corner rounding method of a deep learning-based OPC pattern in operation S130 of generating an OPCed layout.

Figure 6A:
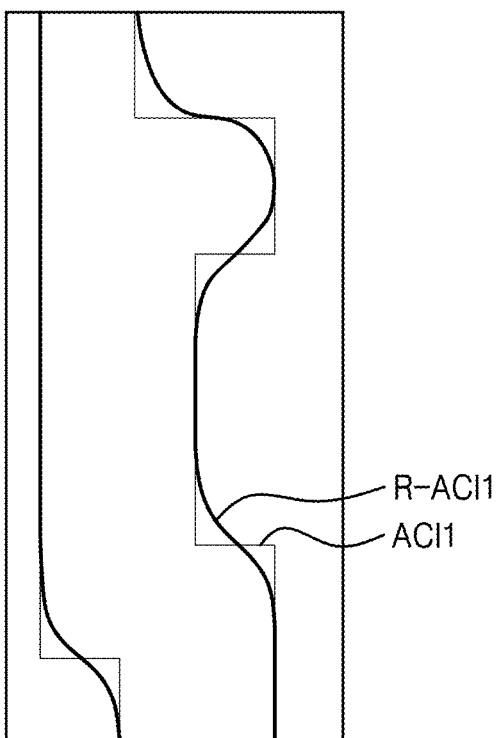
FIGS. 6A and 6B are images illustrating a first contour and a first square layout of FIG. 5A.
Figure 6B:
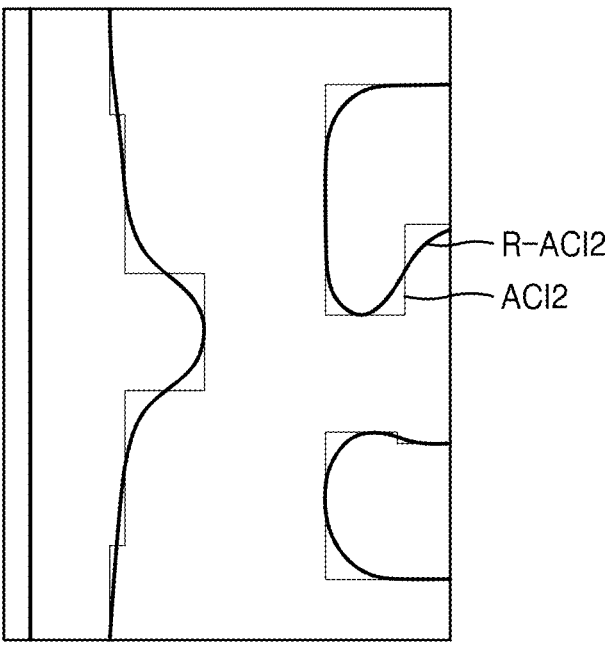

FIGS. 6A and 6B are images illustrating the first contour and the first square layout of FIG. 5A, wherein the thick solid line corresponds to the first contour, and the thin solid line corresponds to the first square layout.

Referring to FIGS. 6A and 6B, when first square layouts ACI1 and ACI2 are input to the first transform model, first contours or first rounded layouts R-ACI1 and R-ACI2 may be obtained. The first transform model may be generated through, for example, deep learning using, e.g., a GAN. According to related art, when rule-based rounded layouts are generated, unlike a contour on a real wafer substrate, the rule-based rounded layouts do not have a different curvature for each corner, and may also have a plurality of corner portions having a big difference from the contour on the real wafer substrate. However, in the OPC method according to the present example embodiments, a rounded layout may be generated through a transform model, thereby accurately generating a rounded layout substantially the same as a contour on a real wafer substrate.

Figure 7A:
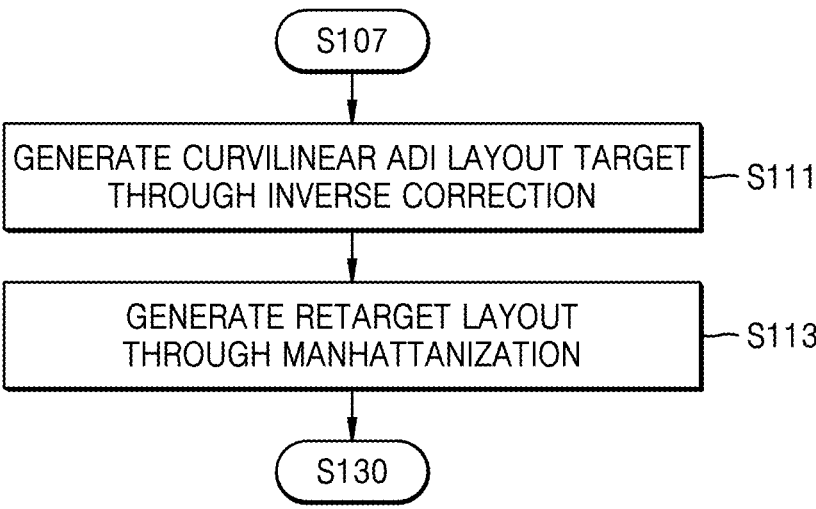
FIGS. 7A and 7B are flowcharts illustrating generating the retarget layout in the operation of generating the retarget layout and generating the OPCed layout in the operation of generating the OPCed layout, respectively, in the OPC method of FIG. 1.
Figure 7B:
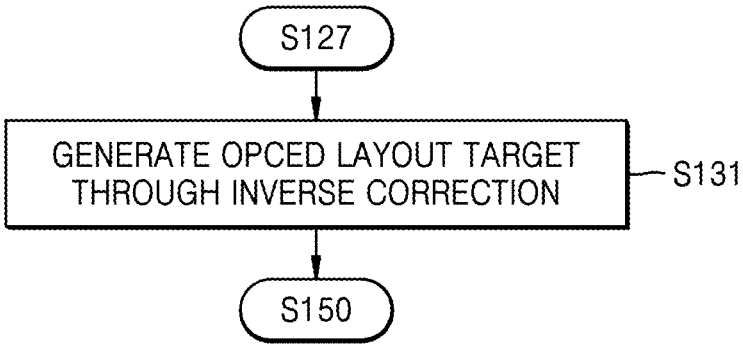

FIGS. 7A and 7B are flowcharts illustrating generating the retarget layout in operation S110 of generating a retarget layout and generating the OPCed layout in operation S130 of generating an OPCed layout, respectively, in the OPC method of FIG. 1.

Referring to FIG. 7A, in the OPC method, operation S110 of generating a retarget layout may include obtaining a first rounded layout target through the corner rounding method and then generating a final retarget layout through inverse correction and Manhattanization. More particularly, in operation S110 of generating a retarget layout, a curvilinear ADI layout target may be generated as follows.

First, a curvilinear ADI layout target is generated through an inverse correction in operation S111. The inverse correction may be achieved through deep learning using, e.g., a GAN. When simply describing the inverse correction, in the deep learning using a GAN, a forward model and an inverse model opposite to the forward model may be generated using an ADI image as an input image and an ACI contour on a wafer substrate as an output image. For example, the forward model may correspond to a model for transforming an ADI image into an ACI contour image, and the inverse model may correspond to a model for inversely transforming an ACI contour image into an ADI image.

When an ADI target image of a square layout form is input to the forward model, the forward model outputs a curvilinear ACI target image. Thereafter, a corrected ADI target image may be generated through EPE. When a rounded ACI target image is input to the inverse model, the inverse model outputs a curvilinear ADI target image. Thereafter, an ADI target may be generated by performing Manhattanization on the curvilinear ADI target image.

In some example embodiments, the inverse model may use an ACI contour from the forward model instead of an ACI contour on a wafer substrate. For example, after generating the forward model through the method described above, forward ACI contour images respectively corresponding to ADI images of a square layout form may be generated by using the forward model, and the inverse model may be generated in deep learning using a GAN by using the ADI images and the forward ACI contour images. Thereafter, a rounded ACI target image may be input to the inverse model to output a curvilinear ADI target image.

As a reference, the terms 'rounded' and 'curvilinear' may be generally used to substantially mean the same. However, when strictly discriminating, the term 'rounded' indicates a curved shape of a corner portion, whereas the term 'curvilinear' indicates a curved shape of the entire layout.

After generating the curvilinear ADI layout target, a final retarget layout may be generated through Manhattanization in operation S113. As described above, a retarget layout may include square edges.

Referring to FIG. 7B, in the OPC method, operation S130 of generating an OPCed layout may include obtaining a second rounded layout target through the corner rounding method and then generating a final OPCed layout through inverse correction. For example, operation S130 of generating an OPCed layout includes generating a curvilinear OPCed layout through inverse correction in operation S131. The inverse correction in operation S130 of generating an OPCed layout may also be achieved through deep learning using, e.g., a GAN.

In operation S110 of generating a retarget layout, a curvilinear ACI target is transformed into a curvilinear ADI target through inverse correction, whereas, in operation S130 of generating an OPCed layout, the curvilinear ADI target is transformed into a curvilinear OPCed layout through inverse correction. For example, in the deep learning, OPCed layouts may be used as input images, and curvilinear ADI images may be used as output images. In addition, in the deep learning, the forward model and the inverse model may be generated. Therefore, when a curvilinear ADI target is input to the inverse model, a curvilinear OPCed layout may be output.

Figure 8A:
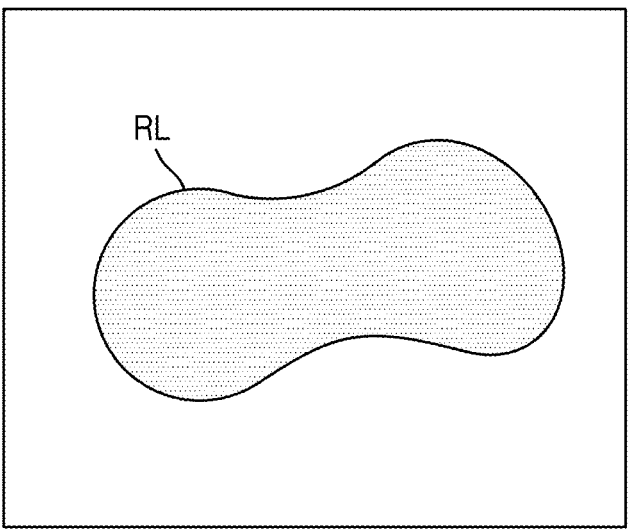
FIGS. 8A and 8B are images for describing Manhattanization on a curvilinear layout.
Figure 8B:
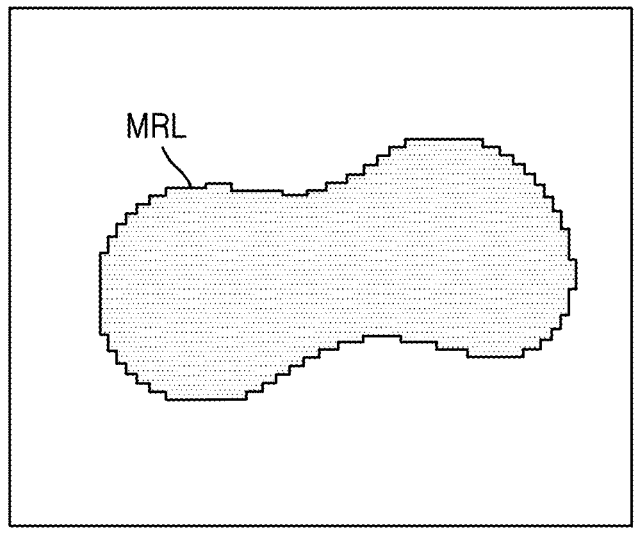

FIGS. 8A and 8B are images for describing Manhattanization on a curvilinear layout. FIG. 8A shows a curvilinear layout, and FIG. 8B shows a square layout after Manhattanization.

Referring to FIGS. 8A and 8B, Manhattanization indicates fracturing a pattern into segments and/or fracturing an edge of a pattern into straight edges. For example, Manhattanization may indicate fracturing an edge of a pattern into straight edges vertical or horizontal to a reference axis. For example, a curvilinear layout RL of FIG. 8A may be transformed into a square layout MRL including straight edges through Manhattanization. In general, Manhattanization may be performed by an automation program. In the automation program, when setting information about a reference axis and size information about segments or straight edges and then inputting a curvilinear layout to the automation program, the automation program may automatically transform the curvilinear layout into a square layout through Manhattanization.

Figure 9:
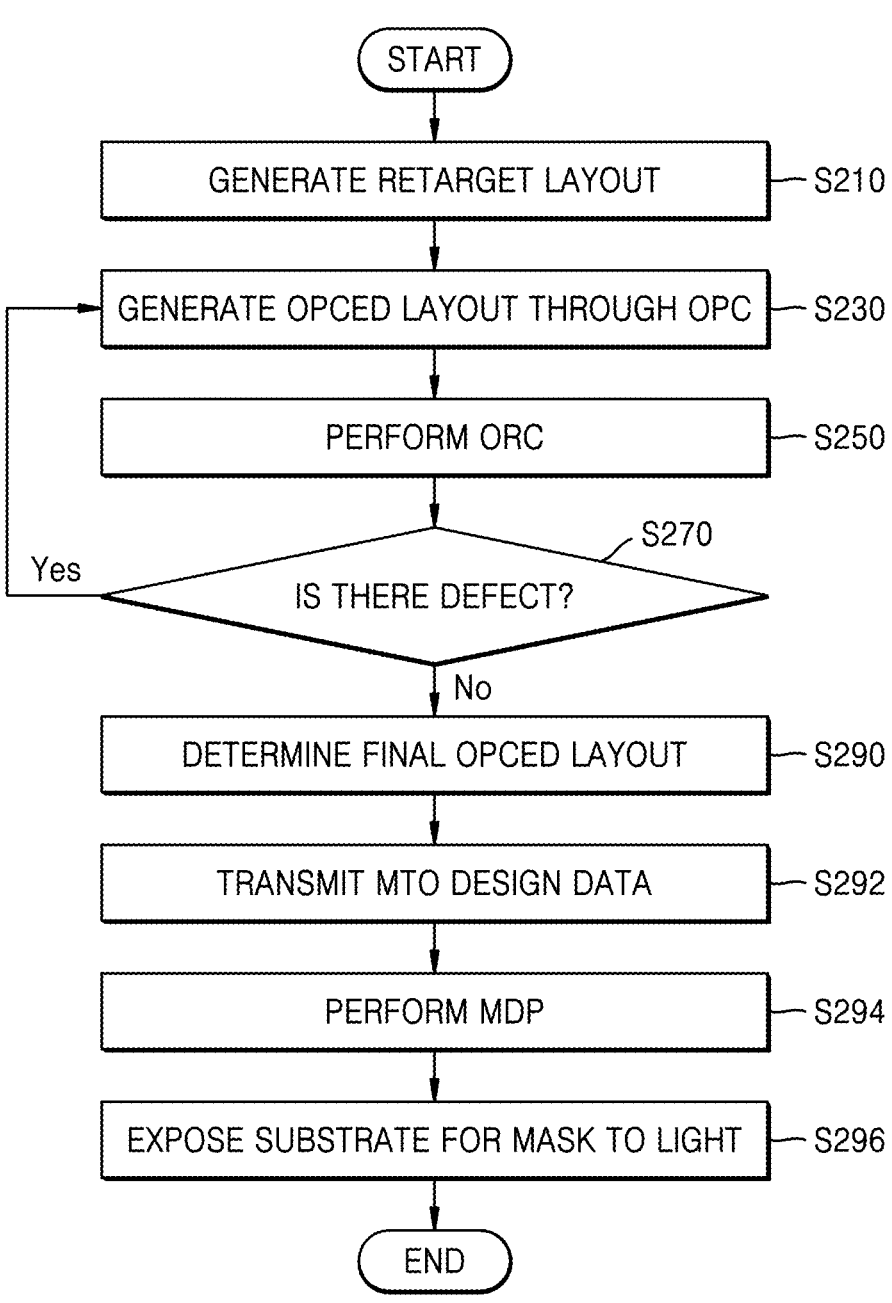
FIG. 9 is a flowchart schematically illustrating a mask manufacturing method including a corner rounding method, according to at least one embodiment of the inventive concepts.

FIG. 9 is a flowchart schematically illustrating a mask manufacturing method including a corner rounding method, according to an embodiment of the inventive concept.

Referring to FIG. 9, in the mask manufacturing method including the corner rounding method (hereinafter, simply "mask manufacturing method") according to the present embodiment, first, a retarget layout is generated in operation S210. The retarget layout may be generated by the corner rounding method. Herein, the corner rounding method may indicate a corner rounding method of a deep learning-based OPC pattern. The corner rounding method has been described above with reference to FIGS. 5A and 5B. In addition, the generating the retarget layout by the corner rounding method has been described above with reference to FIG. 7A.

After generating the retarget layout, an OPCed layout is generated through OPC in operation S230. Herein, the OPC may indicate the general OPC. The general OPC may include a method of adding sub-lithographic features and/or SRAFs onto a corner of a pattern in addition to a shape change in a layout of a pattern.

Performing OPC may include first preparing basic data for the OPC, generating an optical OPC model, generating an OPC model for a PR, and/or the like. A combination of the optical OPC model and the OPC model for the PR is generally called an OPC model, and after generating the OPC model, a simulation using the OPC model is performed to generate an OPCed layout. The mask manufacturing method according to the present embodiment may further include, in addition to the general OPC, generating an OPCed layout based on the corner rounding method.

After generating the OPCed layout, an ORC is performed on the OPCed layout in operation S250. The ORC may include, for example, RMS calculation on a CD error, an EPE calculation, a pinch error check, a bridge error check, and/or the like. Of course, items inspected in the ORC are not limited to the items described above.

After performing the ORC, it is determined in operation S270 whether there is a defect. For example, the defect may correspond to when an RMS of the CD error is greater than a set reference value, when an EPE is greater than a set reference value, when there is a pinch error, when there is a bridge error, and/or the like. In addition, when there are other items in the ORC, cases where corresponding items deviate from a reference may also correspond to defects.

If there is a defect (Yes), the mask manufacturing method proceeds to operation S230 of generating an OPCed layout through OPC. Before the reiteration of operation S230 of generating an OPCed layout through OPC, a cause of the defect may be analyzed, and the cause may be reflected in the OPC model.

If there is no defect (No), an OPCed layout, in which there is no defect, is determined to be a final OPCed layout in operation S290. Operation S210 of generating a retarget layout to operation S290 of determining a final OPCed layout may correspond to the OPC method, of FIG. 1, including a corner rounding method.

Thereafter, the final OPCed layout image is transmitted to a mask manufacturing team as MTO design data in operation S292. In general, MTO may indicate transmitting final mask data obtained by an OPC method to the mask manufacturing team to request mask manufacturing. Therefore, the MTO design data may be substantially the same as data of the final OPCed layout image obtained by the OPC method. The MTO design data may have a graphic data format used in electronic design automation (EDA) software and the like. For example, the MTO design data may have a data format, such as graphic data system II (GDS2) or open artwork system interchange standard (OASIS).

Thereafter, mask data preparation (MDP) is performed in operation S294. The MDP may include, for example, i) format transform called fracturing; ii) augmentation of a barcode for mechanical reading, a standard mask pattern for inspection, a job deck, and/or the like; iii) validation in an automatic and manual manners; and/or the like. Herein, the job deck may indicate creating a text file related to arrangement information of multi-mask files, a reference dose, and a series of instructions related to an exposure speed and scheme and/or the like.

In addition, the format transform (e.g., fracturing) may indicate a process of fracturing the MTO design data for each region to change in a format for an electron beam writer. Fracturing may include a data operation of, for example, scaling, data sizing, data rotation, pattern reflection, color inversion, and/or the like. In transforming through fracturing, data related to many systematic errors, which may occur somewhere during transferring from design data to an image on a wafer, may be corrected. The data correction of the systematic errors is called mask process correction (MPC) and may include, for example, line width adjustment, called CD adjustment, a work for increasing pattern arrangement precision, and the like. Therefore, fracturing may contribute to improvement of the quality of a final mask, and may also be a process performed in advance to correct a mask process. Herein, the systematic errors may be caused by distortion occurring in an exposure process, a mask development and etching process, a wafer imaging process, and/or the like.

For example, the MDP may include the MPC. The MPC may indicate a process of correcting an error (e.g., a systematic error) occurring during an exposure process, as described above. Herein, the exposure process may include electron beam writing, development, etching, baking, and/or the like. In addition, data processing may be performed before the exposure process. The data processing is a kind of pre-processing on mask data and may include grammar check on the mask data, exposure time prediction, and the like.

After performing the MDP, a substrate for a mask is exposed to light based on the mask data in operation S296. Herein, the exposure may indicate, for example, electron beam writing. Herein, the electron beam writing may be performed by, for example, a gray writing scheme using a multi-beam mask writer (MBMW). Alternatively, the electron beam writing may be performed using a variable shape beam (VSB) writer.

In addition, after performing the MDP, an operation of transforming the mask data into pixel data before the exposure process may be performed. The pixel data may be data directly used for real exposure and may include data about a shape to be exposed to light and data about a dose allocated to each of the data about the shape. Herein, the data about the shape may be bit-map data transformed from shape data (e.g., vector data), through, e.g., rasterization (and/or the like).

After the exposure process, a series of processes are performed to complete a mask. The series of processes may include, for example, a development process, an etching process, a cleaning process, and the like. In addition, the series of processes for mask manufacturing may include a measurement process and a defect inspection and repair process. In addition, a pellicle coating process may be included. Herein, the pellicle coating process may indicate a process of attaching pellicles to protect the surface of a mask from possible contamination during mask delivery and a mask available life span after confirming through final cleaning and inspection that there are no contamination particles and chemical stains.

The mask manufacturing method according to the present embodiment may employ the corner rounding method of a deep learning-based OPC pattern in the OPC method. Particularly, operation S210 of generating a retarget layout and/or operation S230 of generating an OPCed layout, in the OPC method, may employ the corner rounding method of a deep learning-based OPC pattern. Accordingly, the mask manufacturing method according to the present embodiment may accurately generate a retarget layout and/or an OPCed layout based on the OPC method including the corner rounding method. As a result, the mask manufacturing method according to the present embodiment may manufacture a reliable mask based on an accurate OPCed layout.

As will be appreciated by one skilled in the art, the example embodiments in this disclosure may be embodied as a system, method, computer program product, and/or a computer program product embodied in one or more computer readable medium(s) having computer readable program code embodied thereon. The computer readable program code may be provided to a processor of a general purpose computer, special purpose computer, and/or other programmable data processing apparatus. The computer readable medium may be a computer readable signal medium and/or a computer readable storage medium. The computer readable storage medium may be any tangible medium that can contain, and/or store a program for use by or in connection with an instruction execution system, apparatus, or device. For example, the example embodiments may be implemented in processing circuitry such hardware, software, or the combination of hardware and software. For example, the processing circuitry more specifically may include (and/or be included in), but is not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), semiconductor elements in an integrated circuit, circuits enrolled as an intellectual property (IP), etc. For example, the term "model" may refer to a software component and/or a hardware component such as a field programmable gate array (FPGA) or an application specific integrated circuit (ASIC), and/or combination of a hardware component and a software component. However, a "model" is not limited to software or hardware. A "model" may be configured to be included in an addressable storage medium or to reproduce one or more processors. Accordingly, for example, a "model" may include components such as software components, object-oriented software components, class components, and task components, processes, functions, attributes, procedures, subroutines, segments of program code, drivers, firmware, microcode, circuits, data, databases, data structures, tables, arrays, and variables. A function provided in components or modules may be integrated with a smaller number of components and/or divided into additional components.

The example embodiments may be applied to designing and manufacturing any electronic devices and systems. For example, the inventive concepts may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

While the inventive concepts have been particularly shown and described with reference to some example embodiments thereof, it will be understood that various changes in form and details may be made therein without departing from the spirit and scope of the following claims.

What is claimed is:

1. A method of training a transform model to perform a corner rounding method of a deep learning-based optical proximity correction (OPC) pattern, the method comprising:
   obtaining a contour of at least one of a photoresist (PR) pattern or an etching pattern on a wafer;
   obtaining a square layout of the at least one PR pattern or etching pattern, corresponding to the contour; and
   generating a transform model through deep learning with the square layout and the contour such that the transform model is configured to output a rounded layout target with respect to a square layout target.

2. The method of claim 1, wherein the deep learning uses a deep convolutional generative adversarial network (DC-GAN),
   wherein an input of the DCGAN is the square layout, and an output of the DCGAN is the contour, and
   wherein the generating the transform model includes training the transform model until the output contour is same as a reference image corresponding to the contour.

3. The method of claim 2, wherein the contour is obtained by using a mean value of a plurality of scanning electron microscope (SEM) images of the at least one PR pattern or etching pattern.

4. The method of claim 2, wherein the square layout includes square edges and is obtained by performing Manhattanization on the contour.

5. The method of claim 1, wherein the PR pattern corresponds to an after develop inspection (ADI) pattern, and
wherein the etching pattern corresponds to an after clean inspection (ACI) pattern.

6. An optical proximity correction (OPC) method comprising:
generating a retarget layout including straight edges;
performing OPC on the retarget layout such that an OPCed layout is generated;
performing an optical rule check (ORC) on the OPCed layout;
determining whether there is a defect in the OPCed layout based on a result of the ORC;
determining the OPCed layout to be a final OPCed layout based on the determination that there is no defect; and
etching a semiconductor element based on the final OPCed layout,
wherein at least one of the retarget layout or the OPCed layout is generated based on a corner rounding of a deep learning-based OPC pattern,
wherein the corner rounding of the deep learning-based OPC pattern comprises:
using a first transform model generated through deep learning with a first square layout of an etching pattern and a first contour of the etching pattern, wherein the first square layout corresponds to the first contour, or
using a second transform model generated through the deep learning with a second square layout of a photoresist (PR) pattern and a second contour of the PR pattern,
wherein the second square layout corresponds to the second contour.

7. The OPC method of claim 6, wherein the generating the retarget layout includes the corner rounding of the deep learning-based OPC pattern and comprises:
obtaining a first rounded layout target corresponding to a first square layout target by using the first transform model, and
wherein the first transform model is generated by
obtaining the first contour,
obtaining the first square layout, and
generating the first transform model such that the first transform model is configured to output the first rounded layout target with respect to the first square layout target.

8. The OPC method of claim 7, wherein the deep learning uses a deep convolutional generative adversarial network (DCGAN),
wherein an input of the DCGAN is the first square layout, and an output of the DCGAN is the first contour.

9. The OPC method of claim 8, wherein the first contour is obtained using a mean value of scanning electron microscope (SEM) images of the etching pattern on a wafer, and
wherein the first square layout includes square edges and is obtained by performing Manhattanization on the first contour.

10. The OPC method of claim 7, wherein the etching pattern corresponds to an after clean inspection (ACI) pattern, and
wherein the generating the retarget layout comprises
performing an inverse correction on the first rounded layout target such that a curvilinear after develop inspection (ADI) layout target is generated, and
performing Manhattanization on the curvilinear ADI layout target such that the retarget layout is generated.

11. The OPC method of claim 6, wherein the generating the OPCed layout includes the corner rounding of the deep learning-based OPC pattern and comprises:
obtaining a second rounded layout target corresponding to a second square layout target by using the second transform model, and
wherein the second transform model is generated by
obtaining the second contour,
obtaining the second square layout, and
generating the second transform model such that the second transform model is configured to output the second rounded layout target with respect the second square layout target.

12. The OPC method of claim 11, wherein the second contour is obtained using a mean value of scanning electron microscope (SEM) images of the PR pattern on a wafer, and
wherein the second square layout is obtained by performing Manhattanization on the second contour and includes square edges.

13. The OPC method of claim 11, wherein the PR pattern corresponds to an after develop inspection (ADI) pattern, and
wherein the generating the OPCed layout comprises performing an inverse correction on the second rounded layout target.

14. A mask manufacturing method comprising:
generating a retarget layout including straight edges;
performing an optical proximity correction (OPC) on the retarget layout such that an OPCed layout is generated;
performing an optical rule check (ORC) on the OPCed layout;
determining whether there is a defect in the OPCed layout based on a result of the ORC; and
determining the OPCed layout to be a final OPCed layout based on the determination that there is no defect;
transmitting an image of the final OPCed layout as mask tape-out (MTO) design data;
preparing mask data based on the MTO design data; and
exposing a substrate to light, based on the mask data,
wherein at least one of the retarget layout or the OPCed layout is generated based on a corner rounding of a deep learning-based OPC pattern,
wherein the corner rounding of the deep learning-based OPC pattern comprises:
using a first transform model generated through deep learning with a first square layout of an etching pattern and a first contour of the etching pattern, wherein the first square layout corresponds to the first contour, or
using a second transform model generated through the deep learning with a second square layout of a photoresist (PR) pattern and a second contour of the PR pattern,
wherein the second square layout corresponds to the second contour.

15. The mask manufacturing method of claim 14, wherein the generating the retarget layout includes the corner rounding of a deep learning-based OPC pattern and comprises:
obtaining a first rounded layout target corresponding to a first square layout target by using a first transform model, and
wherein the first transform model is generated by
obtaining the first contour,
obtaining the first square layout, and generating the first transform model such that the first transform model is configured to output the first rounded layout target with respect to the first square layout target.

16. The mask manufacturing method of claim 15, wherein the deep learning uses a deep convolutional generative adversarial network (DCGAN), wherein an input of the DCGAN is the first square layout, and an output of the DCGAN is the first contour, wherein the first contour is obtained using a mean value of scanning electron microscope (SEM) images of the etching pattern on a wafer, and wherein the first square layout includes square edges and is obtained performing Manhattanization on the first contour.

17. The mask manufacturing method of claim 15, wherein the etching pattern corresponds to an after clean inspection (ACI) pattern, and wherein the generating the retarget layout comprises performing an inverse correction on the first rounded layout target such that a curvilinear after develop inspection (ADI) layout target is generated, and performing Manhattanization on the curvilinear ADI layout target such that the retarget layout is generated.

18. The mask manufacturing method of claim 14, wherein the generating the OPCed layout includes the corner rounding of the deep learning-based OPC pattern and comprises:

obtaining a second rounded layout target corresponding to a second square layout target by using a second transform model, and wherein the second transform model is generated by obtaining the second contour, obtaining the second square layout, and generating the second transform model such that the second transform model is configured to output the second rounded layout target with respect the second square layout target.

19. The mask manufacturing method of claim 18, wherein the second contour is obtained using a mean value of scanning electron microscope (SEM) images of the PR pattern on the wafer, and wherein the second square layout is obtained by performing Manhattanization on the second contour and includes square edges.

20. The mask manufacturing method of claim 18, wherein the PR pattern corresponds to an after develop inspection (ADI) pattern, and wherein the generating the OPCed layout comprises performing an inverse correction on the second rounded layout target.

\*    \*    \*    \*    \*